United States Patent
Boussant-Roux et al.

(10) Patent No.: US 8,715,807 B2
(45) Date of Patent: May 6, 2014

(54) FUSED GRAINS OF OXIDES COMPRISING AL, TI AND MG AND CERAMIC PRODUCTS COMPRISING SUCH GRAINS

(75) Inventors: Yves Boussant-Roux, Montfavet (FR); Isabelle Cabodi, Cavaillon (FR); Samuel Marlin, Plan d'Orgon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 721 days.

(21) Appl. No.: 13/002,522

(22) PCT Filed: Jul. 2, 2009

(86) PCT No.: PCT/FR2009/051294
§ 371 (c)(1),
(2), (4) Date: Mar. 15, 2011

(87) PCT Pub. No.: WO2010/001064
PCT Pub. Date: Jan. 7, 2010

(65) Prior Publication Data
US 2011/0171421 A1  Jul. 14, 2011

(30) Foreign Application Priority Data
Jul. 4, 2008 (FR) ..................................... 08 54577

(51) Int. Cl.
| | | |
|---|---|---|
| *C04B 35/478* | (2006.01) | |
| *C04B 35/626* | (2006.01) | |
| *C04B 35/653* | (2006.01) | |
| *C04B 35/622* | (2006.01) | |
| *C04B 35/462* | (2006.01) | |
| *C04B 35/46* | (2006.01) | |
| *F01N 3/022* | (2006.01) | |
| *F01N 3/28* | (2006.01) | |

(52) U.S. Cl.
CPC ............ *C04B 35/478* (2013.01); *C04B 35/462* (2013.01); *C04B 35/46* (2013.01); *C04B 35/653* (2013.01); *C04B 35/622* (2013.01); C04B 2235/3232 (2013.01); C04B 2235/3217 (2013.01); C04B 2235/3418 (2013.01); C04B 2235/3206 (2013.01); C04B 2235/72 (2013.01); C04B 2235/80 (2013.01); C04B 2235/9607 (2013.01); F01N 3/0222 (2013.01); F01N 3/2828 (2013.01)
USPC ........... 428/116; 501/136; 501/118; 501/121; 501/122; 501/134; 264/140; 241/3; 241/30; 55/523; 502/439; 422/180

(58) Field of Classification Search
CPC .... C04B 35/46; C04B 35/465; C04B 35/478; C04B 35/107; C04B 35/62259; C04B 2111/0025; C04B 31/1015; C04B 2235/3232; C04B 35/05; C04B 2235/3206; C04B 2235/3217; C04B 2235/9607; F01N 3/0222; F01N 3/022; F01N 3/2828; F01N 3/035
USPC .......... 428/116; 501/134, 136, 119, 121, 138, 501/153, 154, 94, 108, 122; 419/55; 264/140, 125; 420/544; 423/325, 326, 423/327.1, 327.2, 328.1, 331; 51/309
See application file for complete search history.

(56) References Cited

U.S. PATENT DOCUMENTS

| | | | |
|---|---|---|---|
| 4,307,198 A * | 12/1981 | Oda et al. ....................... 501/136 |
| 5,137,789 A | 8/1992 | Kaushal | |
| 2006/0009347 A1 | 1/2006 | Fukuda et al. | |
| 2006/0239880 A1 | 10/2006 | Fukuda et al. | |
| 2007/0197369 A1 | 8/2007 | Marlin et al. | |
| 2010/0237007 A1 | 9/2010 | Merkel et al. | |
| 2011/0097582 A1 * | 4/2011 | Tohma et al. ................. 501/136 |

FOREIGN PATENT DOCUMENTS

| | | | |
|---|---|---|---|
| DE | 37 07 396 A1 | 9/1988 | |
| JP | 54-25915 A | 2/1979 | |
| JP | 2007-223892 A | 9/2007 | |
| WO | WO 2008/005249 A2 | 1/2008 | |

OTHER PUBLICATIONS

Giordano et al. "Microstructure and thermal expansion of Al2TiO5—MgTi2O5 solid solutions obtained by reaction sintering", 2002 (no month date), Elsevier Science Ltd., Journal of the European Ceramic Society, vol. 22, pp. 1811-1822.*
International Search Report issued Oct. 5, 2010, in Patent Application No. PCT/FR2009/051294.
Masayuki Ishitsuka, et al., "Synthesis and Thermal Stability of Aluminum Titanate Solid Solutions", Journal of the American Ceramic Society, vol. 70, No. 2, XP 2512516, 1987, pp. 69-71.

(Continued)

*Primary Examiner* — David Sample
*Assistant Examiner* — Nicholas W Jordan
(74) *Attorney, Agent, or Firm* — Oblon, Spivak, McClelland, Maier & Neustadt, L.L.P.

(57) ABSTRACT

A mixture of fused grains mainly comprising or composed of an oxide phase of pseudo-brookite type and comprising titanium, aluminum and magnesium, the fused grains having the following chemical composition, in weight percentages on the basis of the oxides: less than 55% of $Al_2O_3$; more than 30% and less than 70% of $TiO_2$; more than 1% and less than 15% of MgO, the fused grains also corresponding to the following composition, in molar percentages and on the basis of the single oxides $Al_2O_3$, $TiO_2$, MgO: $180 \leq 3t+a \leq 220$, $a \leq 50$, $m=100-a-t$, in which: a is the molar percentage of $Al_2O_3$; t is the molar percentage of $TiO_2$; m is the molar percentage of MgO. A ceramic product obtained from such fused grains.

14 Claims, 1 Drawing Sheet

(56) References Cited

OTHER PUBLICATIONS

H. Wohlfromm, et al., "Effect of $ZrSiO_4$ and MgO additions on reaction sintering and properties of $Al_2TiO_5$-based materials", Journal of Materials Science, vol. 25, No. 8, XP 2512515, Aug. 1990, pp. 3753-3764.

R. Ya. Khodakovskaya, "Polyanionic Glasses: The Future of Properties and Structures", Journal of Non-Crystalline Solids 123, 1990, pp. 275-282.

* cited by examiner

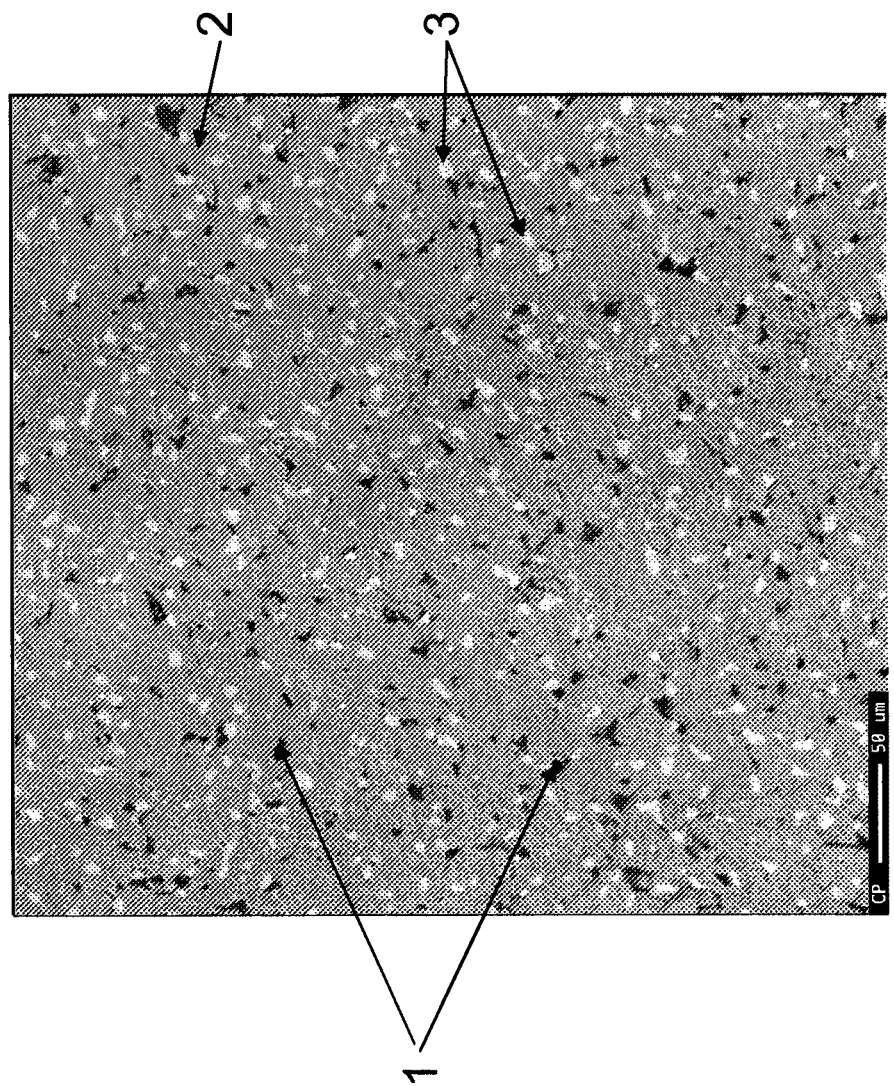

FUSED GRAINS OF OXIDES COMPRISING AL, TI AND MG AND CERAMIC PRODUCTS COMPRISING SUCH GRAINS

The invention relates to grains for ceramic applications that are predominantly composed of oxides of Mg, Al and Ti cations. The invention also relates to a process for manufacturing such grains, and also to ceramic products formed from said grains or comprising the latter, in particular but not uniquely to filter structures or catalyst supports, in particular that are used in an exhaust line of a diesel-type internal combustion engine.

In the remainder of the description, the application of the grains according to the invention and their advantages in the specific field of filters or catalyst supports enabling the removal of pollutants contained in the exhaust gases originating from a petrol or diesel engine are described. It is however obvious that such grains, via the advantages that they provide, are capable of being used advantageously in numerous other applications in the field of ceramics, especially in any field for which a good thermal stability and/or a low thermal expansion coefficient (TEC) are desired. Mention may be made, in particular, but without being limited thereto, of the following fields: manufacture of refractory parts used in contact with aluminum or molten metals, slide-gate valve plates, metal filters or manufacture of saggar products for sintering furnaces.

In the particular case of exhaust gas pollution control structures, these generally have a honeycomb structure.

In a known manner, during its use, a particulate filter is subjected to a succession of filtration (soot accumulation) and regeneration (soot elimination) phases. During the filtration phases, the soot particles emitted by the engine are retained and deposited inside the filter. During the regeneration phases, the soot particles are burnt off inside the filter, in order to restore its filtering properties. It is understood therefore that the properties of mechanical strength, both at low and at high temperature, of the material that forms the filter are of prime importance for such an application. Similarly, the material must have a sufficiently stable structure in order to withstand, especially throughout the service life of the equipped vehicle, temperatures which may rise locally up to values which may be greater than 1000° C., especially if the regeneration phases are poorly controlled.

Currently, the filters are mainly made from a porous ceramic material, for example from silicon carbide, from cordierite or from aluminum titanate. Such silicon carbide catalyst filters are, for example, described in patent applications EP 816 065, EP 1 142 619, EP 1 455 923 or WO 2004/090294 and WO 2004/065088. Such filters make it possible to obtain chemically inert filter structures that have excellent thermal conductivity and that have porosity characteristics, in particular the average pore size and the pore size distribution, which are ideal for an application in filtering soot from an internal combustion engine.

However, certain drawbacks specific to this material still remain:

A first drawback is linked to the slightly raised thermal expansion coefficient of the SiC, greater than $3 \cdot 10^{-6}$ $K^{-1}$, which does not allow large-sized monolithic filters to be manufactured and usually requires the filter to be divided into several honeycomb elements joined together by a cement, such as is described in application EP 1 455 923. A second drawback, of economic nature, is linked to the extremely high firing temperature, typically greater than 2100° C., enabling a sintering that provides a sufficient thermomechanical strength of the honeycomb structures, especially during successive filter regeneration phases. Such temperatures require the installation of special equipment which substantially increases the cost of the filter finally obtained.

On the other hand, although cordierite filters are known and have been used for a long time due to their low cost, it is now known that problems can arise in such structures, especially during poorly controlled regeneration cycles, during which the filter may be subjected locally to temperatures above the melting point of the cordierite. The consequences of these hot spots may range from a partial loss of efficiency of the filter to its total destruction in the most severe cases. Moreover, cordierite does not have sufficient chemical inertia with respect to the temperatures achieved during successive regeneration cycles and is therefore capable of reacting and of being corroded by the species originating from the residues of lubricant, fuel or other oils accumulated in the structure during the filtration phases, this phenomenon possibly also being the cause of the rapid deterioration of the properties of the structure.

For example, such drawbacks are described in patent application WO 2004/011124 which proposes, in order to remedy them, a filter based on aluminum titanate (60 to 90% by weight) reinforced by mullite (10 to 40% by weight), the durability of which is improved.

According to another embodiment, application EP 1 559 696 proposes the use of powders for the manufacture of honeycomb filters obtained by reactive sintering of oxides of aluminum, titanium and magnesium between 1000 and 1700° C. The material obtained after sintering is in the form of a two-phase mixture: a major phase of $Al_2O_3.TiO_2$ ($Al_2TiO_5$) aluminum titanate or pseudo-brookite structural type containing titanium, aluminum and magnesium and a minor feldspar phase, of $Na_yK_{1-y}AlSi_3O_8$ type.

However, the experiments carried out by the Applicant have shown that it was difficult, at the current time, to guarantee the performances of a structure based on materials of aluminum titanate type, in particular to achieve thermal stability, thermal expansion coefficient and corrosion resistance values suitable, for example, for making it directly usable in a high-temperature application of the particulate filter type.

In particular, in the particular application of filtration of particulates by a material of the oxide group, the corrosion resistance must be controlled, so as to avoid modifications of the porosity of the filter. More specifically, a high propensity to the corrosion of the material used as a constituent of the filter causes a reaction capable of closing up the porosity and considerably reducing the filtration capacity and, in the most severe cases, may be the cause of a leak by piercing of a filter wall.

The objective of the present invention is thus to provide novel grains comprising or composed of an oxide material of the pseudo-brookite type, having properties as described previously which are substantially improved, especially so as to make the use thereof more advantageous in numerous fields of application for ceramic materials and in particular for the manufacture of a filter and/or catalyst structure, typically of honeycomb structure.

More specifically, the present invention relates to fused grains mainly comprising or composed of an oxide phase of pseudo-brookite type and comprising titanium, aluminum and magnesium, said fused grains having the following chemical composition, in weight percentages on the basis of the oxides:
 less than 52% of $Al_2O_3$;
 more than 30% and less than 70% of $TiO_2$;
 more than 1% and less than 15% of MgO, said fused grains also corresponding to the following composition, in molar percentages and on the basis of the single oxides $Al_2O_3$, $TiO_2$, MgO:

180≤3t+a≤220,
a≤50,
m=100−a−t
in which:
a is the molar percentage of $Al_2O_3$;
t is the molar percentage of $TiO_2$;
m is the molar percentage of MgO.

The term "mainly" is understood within the present description to mean that the phase of pseudo-brookite type represents at least 60% and preferably at least 70% or even 80% of the total weight of the grains.

The expression "on the basis of the oxides" is understood to mean that the above weight or molar percentages are calculated on the basis of the oxides corresponding to the elements present in said grains.

Preferably, in the preceding formulation, 185≤3t+a≤215 and very preferably 190≤3t+a≤210.

Preferably, $Al_2O_3$ represents more than 15% of the chemical composition, the percentages being given by weight on the basis of the oxides corresponding to the elements present in said grains. For example, in particular for an application of the porous structure type, $Al_2O_3$ may represent more than 25% and more preferably more than 35%, or even more than 39% of the chemical composition. Preferably, $Al_2O_3$ represents less than 51% of the chemical composition, the percentages being given by weight on the basis of the oxides.

Preferably, $TiO_2$ represents more than 35% and very preferably more than 39% of the chemical composition.

Preferably $TiO_2$ represents less than 60% and very preferably less than 55%, of the chemical composition, the percentages being given by weight on the basis of the oxides.

Preferably, MgO represents more than 1.5% and very preferably more than 2% of the chemical composition. Preferably MgO represents less than 10% and very preferably less than 5% of the chemical composition, the percentages being given by weight and on the basis of the oxides.

Relative to the weight percentage of all the corresponding oxides, the grains according to the invention may also comprise other elements present in the minority. In particular, the grains may comprise silicon, in an amount, for example, between 0.01 and 20%, preferably between 0.1 and 10%, on an $SiO_2$ basis.

The grains may also comprise other elements such as Ca, Na, K, Fe, Zr, the total additive amount of said elements present preferably being below 3 wt %, preferably below 2 wt % on the basis of the corresponding oxides, relative to the weight percentage of all of the oxides present in said grains. The weight percentage of each minority element, on the basis of the weight of the corresponding oxide, is preferably less than 0.7%.

In order not to needlessly increase the present description, all the possible combinations according to the invention between the various preferred modes of compositions of the grains according to the invention, such as have just been described above, are not reported. It is however clearly understood that all the possible combinations of the initial and/or preferred fields and values described previously are envisaged and should be considered as described by the Applicant in the context of the present description (in particular of two, three combinations or more).

The grains according to the invention may also comprise a minority phase composed of a silicate phase, in proportions which may range from 0 to 40% of the total weight of the grains, preferably from 0 to 30% and very preferably from 0 to 25% of the total weight of the grains. According to the invention, said silicate phase may be mainly composed of silica and alumina. Preferably, the proportion of silica in the silicate phase is greater than 50%, or even greater than 60%.

The grains according to the invention may also comprise a minority phase essentially comprising titanium oxide $TiO_2$. The expression "essentially comprising" is understood to mean that the weight percentage of $TiO_2$ in this phase is of the order of at least 80%, or even of at least 90%.

Most often, the oxide phase of pseudo-brookite type present in the fused grains is a solid solution which may substantially correspond to the formulation $(Al_2TiO_5)_x(MgTi_2O_5)_{1-x}$, in which x is greater than 0 and may vary between 0 and 1.

The invention also relates to ceramic products comprising grains as described previously, especially for use in the following fields: manufacture of refractory parts used in contact with aluminum or with molten metals, slide-gate valve plates, metal filters or manufacture of saggar products for sintering furnaces.

The invention also relates to ceramic products that are obtained after sintering the above grains, at a temperature between 1300 and 1800° C., said products being characterized in that they are composed of a ceramic material mainly comprising or composed of an oxide phase of pseudo-brookite type and comprising titanium, aluminum and magnesium, in proportions such that the pseudo-brookite type phase corresponds substantially to the formulation $(Al_2TiO_5)_x(MgTi_2O_5)_{1-x}$, said material having the following chemical composition, in weight percentages on the basis of the oxides:
less than 55% of $Al_2O_3$;
more than 30% and less than 70% of $TiO_2$;
more than 1% and less than 15% of MgO.

The term "substantially" is understood within the sense of the present description to mean that the percentage calculated for each of the oxides corresponding to the elements present in the main phase of pseudo-brookite type (Al, Ti, Mg) does not deviate more than 5%, and preferably not more than 2%, from around the percentage corresponding to an ideal formulation $(Al_2TiO_5)_x(MgTi_2O_5)_{1-x}$.

According to the invention, the value of x is not particularly limited and depends on the application envisaged and on the properties desired for the grains.

By way of example, for an application of the filtering structure and/or catalytic type, typically as a honeycomb for an automotive exhaust line, the value of x may be between 0.7 and 1 (the value x=1 being excluded), for example between 0.8 and 0.95.

According to one possible embodiment, the phase of pseudo-brookite type of the ceramic material has the following chemical composition, in weight percentages, on the basis of the oxides:
more than 39% and less than 54% of $Al_2O_3$, for example more than 45% and less than 52% of $Al_2O_3$;
more than 45% and less than 55% of $TiO_2$, for example less than 50% of $TiO_2$;
more than 1% and less than 5% of MgO.

The ceramic product may comprise a main phase of pseudo-brookite type and at least one secondary phase, said secondary phase being a silicate phase and/or a phase composed essentially of titanium oxide $TiO_2$.

For example, the secondary phase is composed of a silicate phase, in proportions which may range from 0 to 40% of the total weight of the material.

According to possible embodiments according to the invention, the preferred fields of composition of the ceramic material are identical to those already described previously in relation to the fused grains. In order not to needlessly increase the present description, all the possible combinations among the various preferred modes of the values and fields of compositions described previously in relation to the composition of the grains are not therefore repeated for the ceramic material, but should be considered to be included in the present description.

The grains of the invention may advantageously be produced by electrofusion, which allows the manufacture of large amounts of grains with advantageous yields and a very good price/performance ratio.

The invention also relates to the process for manufacturing grains described previously, comprising the following steps:
 a) mixing raw materials to form the starting feedstock;
 b) fusion of the starting feedstock until a molten liquid is obtained;
 c) cooling of said molten liquid so that the fused liquid is entirely solidified, for example in less than 3 minutes; and
 d) optionally, milling of said solid mass so as to obtain a mixture of grains.

According to the invention, the raw materials are chosen in step a) so that the grains obtained in step d) are in accordance with the invention.

Of course, without departing from the scope of the invention, any other conventional or known process for manufacturing fused grains may also be used, provided that the composition of the feedstock makes it possible to obtain grains having a composition according to that of the grains of the invention.

In step b), use is preferably made of an electric arc furnace, but any known furnaces can be envisaged, such as an induction furnace or a plasma furnace, provided that they make it possible to completely melt the feedstock. Firing is preferably carried out under inert conditions, for example under argon, or oxidizing conditions, preferably at atmospheric pressure.

In step c), the cooling may be rapid, that is to say the fused liquid is completely solidified in less than 3 minutes. Preferably, it results from casting in CS molds as described in U.S. Pat. No. 3,993,119 or from quenching.

In step d), the solid mass is milled, according to conventional techniques, until the size of the grains suitable for the envisaged application is obtained.

According to one particular application, the present invention relates to a structure of honeycomb type, made from a porous ceramic material, said structure being composed of a porous ceramic material obtained from at least 5% by weight of grains according to the invention and preferably from at least 20%, 50%, 80% or even 100% by weight of grains according to the invention, said structure also having a porosity of greater than 10% and a pore size centered between 5 and 60 microns.

When the structures obtained according to the invention are intended for use as a particulate filter, they have a suitable porosity, in general between 20 and 65%, the average pore size ideally being between 10 and 20 microns.

Such filtering structures usually have a central part comprising a honeycomb filtering element or a plurality of honeycomb filtering elements joined together by a joint cement, said element or elements comprising a set of adjacent ducts or channels with axes parallel with one another separated by porous walls, which ducts are stopped by plugs at one or other of their ends to delimit inlet chambers opening on a gas intake face and outlet chambers opening on a gas discharge face, in such a way that the gas passes through the porous walls.

A process for manufacturing such a structure from an initial mixture of grains according to the invention is for example the following:

Firstly, fused grains according to the invention are mixed as described previously. For example, the fused grains were milled so that they have a median diameter of less than 50 microns.

The manufacturing process typically comprises a step of mixing an initial mixture comprising the grains, an organic binder of methyl cellulose type and a pore-forming agent, then adding water until the plasticity desired for enabling the extrusion step that follows is obtained.

For example, during the first step, a mixture comprising the following is mixed:
 at least 5%, for example at least 50%, or at least 90% or even 100% of grains according to the invention, the remainder of the mixture possibly being composed of powder or grains of other materials or else of single oxides of the elements Al, Ti, Mg or of precursors of said oxides, for example in the form of carbonates, hydroxides or other organometallic compounds of the preceding elements;
 optionally from 1 to 30% by weight of at least one pore-forming agent chosen as a function of the desired pore size;
 at least one organic plasticizer and/or an organic binder; and
 a suitable amount of water to enable the forming of the product.

The mixing results in a homogeneous product in the form of a paste. The step of extruding this product through a suitable die makes it possible to obtain monoliths in honeycomb form. The process further comprises, for example, a step of drying the monoliths obtained. During the drying step, the green ceramic monoliths obtained are typically dried by microwave or at a temperature for a sufficient time to bring the content of water not chemically bound to less than 1% by weight. In the case where it is desired to obtain a particulate filter, the process may also comprise a step of closing off one channel in two at each end of the monolith.

The step of firing the monoliths is carried out at a temperature above 1300° C. but that does not exceed 1800° C., preferably that does not exceed 1750° C. For example, during this firing step, the monolith structure is brought to a temperature between 1400° C. and 1600° C., under an atmosphere that contains oxygen or an inert gas.

The process may optionally comprise a step of assembling monoliths into a filtration structure assembled to well-known techniques, for example described in application EP 816 065.

The present invention also relates to a filter or a catalyst support obtained from a structure as described previously and by deposition, preferably by impregnation, of at least one supported or preferably unsupported active catalyst phase, typically comprising at least one precious metal such as Pt and/or Rh and/or Pd and optionally an oxide such as $CeO_2$, $ZrO_2$, $CeO_2$—$ZrO_2$. Such structures especially find their application as a catalyst support in an exhaust line of a diesel or petrol engine or as a particulate filter in an exhaust line of a diesel engine.

The invention and its advantages will be better understood on reading the following non-limiting examples. In the examples, all the percentages are given by weight.

EXAMPLES

In all the examples, the samples were prepared from the following raw materials:

anatase comprising more than 98% of $TiO_2$, sold by Altichem, or rutile comprising more than 95% of $TiO_2$ and having a median diameter $d_{50}$ of around 120 μm, sold by Europe Minerals;

alumina AR75 comprising more than 98% of $Al_2O_3$, sold by Alcan and having a median diameter $d_{50}$ of around 85 μm;

$SiO_2$ with a degree of purity greater than 99.5% and of median diameter $d_{50}$: 208 μm, sold by Sifraco;

MgO with a degree of purity greater than 98% with more than 80% of particles having a diameter between 0.25 and 1 mm, sold by Nedmag;

lime comprising around 97% of CaO, with more than 80% of particles having a diameter of less than 80 μm; and potassium carbonate containing more than 99.5% of $K_2CO_3$, sold by Albemarle with more than 80% of particles having a diameter between 0.25 and 1 mm.

The samples of Examples 1, 2, 4 and 5 according to the invention were obtained by melting the mixture of the preceding powders, in the appropriate proportions.

More precisely, the initial mixtures of reactants were melted in an electric arc furnace, in air. The fused mixture was then cast in a CS mold so as to obtain rapid cooling. The product obtained is milled and screened in order to retain the powder exceeding 36 μm. This powder is used to produce pressed samples 35 mm in diameter that are then sintered at a temperature of 1450° C. for 4 hours.

Shown in FIG. 1 is an electron microprobe analysis of the sample according to Example 4. Observed in black are porosities 1, in dark grey is a majority phase 2 comprising titanium, aluminum and magnesium in the form of a solid solution of an oxide, and in light grey is a second phase 3 composed predominantly of $TiO_2$. The absence of a silicate phase is also observed.

The sample from Example 3, which does not conform to the invention, was synthesized by way of comparison. In Example 3, the initial oxides were directly mixed in the same proportions as for Example 2 according to the invention. In accordance with the teaching from the prior art, the raw materials from Example 2 were premixed in the same proportions then sintered at 1450° C. for 4 hours. The resulting product was then milled, then pressed and sintered at 1450° C. for 4 hours. The sample obtained in the end according to Example 3 does not conform to the invention and is given solely by way of comparison.

The samples prepared are then analyzed. The results of the analyses carried out on each of the samples of Examples 1 to 5 are collated in Tables 1 and 2.

In Tables 1 and 2:

1°) The chemical composition, indicated in weight percentages on the basis of the oxides, was determined by X-ray fluorescence.

2°) The crystalline phases present in the refractory products were characterized by X-ray diffraction. In Table 1, "M" corresponds to the main phase, "S" indicates the secondary phase, "~" means that the phase is present in trace amounts, AMTx indicates a solid solution of the $(Al_2TiO_5)_x(MgTi_2O_5)_{1-x}$ type, P2 indicates the presence of a second minority phase and PS indicates the additional presence of a silicate phase.

3°) The stability of the crystalline phases present is evaluated by a test that consists in comparing, by X-ray diffraction, the crystalline phases present initially to those present after a heat treatment of 10 or 100 hours at 1100° C. If the phases remain identical after this treatment, the product is considered to be stable.

4°) The thermal expansion coefficient (TEC) corresponds to the average of the values conventionally obtained from 25° C. to 1000° C. by dilatometry on pellets prepared from powders of the same particle size range, the median diameter $d_{50}$ of which is less than 50 μm. The pellets are obtained by pressing then sintering at 1450° C. for 3 h in air.

5°) The corrosion resistance is evaluated by shaping a sample of pressed and sintered powder into a disk with a diameter of 35 mm, in the presence of $K_2SO_4$. 0.2 g of $K_2SO_4$ powder are deposited uniformly over the surface of the disk. The sample thus covered is then brought to 1300° C. in air for 5 hours. After cooling, the sample is cut along a radial cross section and prepared for cross-sectional observation using a scanning electron microscope. The depth E of the sample, starting from the initial surface of the disk, affected by corrosion is then evaluated visually in the SEM photographs.

6°) The modulus of rupture (MOR) is determined at ambient temperature by 4-point bending in a conventional manner on bars having dimensions 45 mm×4 mm×3 mm.

TABLE 1

| | Example | | | | |
|---|---|---|---|---|---|
| | 1 (inv.) | 2 (inv.) | 3 (comp) | 4 (inv.) | 5 (inv.) |
| $Al_2O_3$ | 45.1 | 40.0 | 41.0 | 46.7 | 50.0 |
| $TiO_2$ | 44.5 | 49.1 | 48.2 | 50.5 | 40.3 |
| MgO | 3.56 | 4.17 | 4.67 | 1.19 | 2.67 |
| $SiO_2$ | 6.46 | 5.08 | 4.08 | 0.31 | 5.75 |
| CaO | 0.04 | 0.22 | 0.28 | 0.03 | 0.06 |
| $Na_2O$ | 0.12 | 0.12 | 0.26 | 0.11 | 0.21 |
| $K_2O$ | 0.13 | 0.64 | 0.46 | <0.01 | <0.01 |
| $Fe_2O_3$ | 0.09 | 0.64 | 0.61 | 0.61 | 0.44 |
| $ZrO_2$ | <0.1 | 0.03 | 0.05 | 0.55 | 0.57 |
| a | 40.7 | 35.3 | 35.3 | 40.7 | 46.0 |
| t | 51.2 | 55.3 | 55.3 | 56.2 | 47.3 |
| m | 8.1 | 9.3 | 9.3 | 2.6 | 6.2 |
| 3t + a | 194 | 201 | 201 | 209 | 188 |
| Phases AMTx | M | M | M | M | M |
| P2 | no | ~ | ~ | S | S |
| Other phase | no | no | no | no | no |
| PS | yes | yes | yes | no | yes |
| Stability 10 hours | yes | yes | yes | yes | yes |
| 100 hours | yes | yes | yes | ND | yes |
| TEC ($10^{-6}$/° C.) | 2.4 | 4.1 | ND | 1.2 | ND |
| Depth E affected by the erosion (μm) | ND | 20 | 150 | ND | ND |
| MOR (MPa) | ND | 12.2 | ND | 7.5 | ND |

ND: not determined

It is observed by comparing the data from Table 1 that the grains according to the invention make it possible to obtain, in the end, ceramic products that are characterized simultaneously by a good thermal stability, sufficient mechanical strength, and by a resistance to corrosion which is very greatly improved, as shown by the comparison of the eroded depths of the samples of Examples 2 and 3.

The composition of each phase was then analyzed by microprobe analysis, the results of the analysis being given in Table 2. On the basis of these results, the weight percentage of each phase and also the value of x in the formula $(Al_2TiO_5)_x(MgTi_2O_5)_{1-x}$ of the main AMTx phase was able to be estimated by calculation.

TABLE 2

| Example | 1 | | | 2 | | | 4 | |
|---|---|---|---|---|---|---|---|---|
| Phase | AMTx | PS | P2 | AMTx | PS | P2 | AMTx | P2 |
| $Al_2O_3$ | 46.3 | 19.3 | 0.2 | 48.2 | 23.5 | | 50.4 | 0.7 |
| $TiO_2$ | 49.8 | 2.9 | 99.0 | 48.5 | 5.0 | 96.2 | 46.9 | 91.8 |
| MgO | 3.54 | 9.9 | | 2.5 | 3.8 | | 1.44 | |
| $SiO_2$ | 0.29 | 66.3 | | 0.2 | 59 | | 0.1 | 0.2 |
| CaO | | 0.9 | | | 2.8 | | | |
| $Na_2O$ | | 0.7 | | | 1.3 | | | |
| $K_2O$ | | | | | 4.4 | | | |
| $Fe_2O_3$ | | | | 0.4 | 0.1 | | 0.5 | 0.2 |
| $ZrO_2$ | | | | 0.1 | 0.1 | 3.0 | 0.48 | 6.96 |
| estimated x (%) | 0.842 | — | — | 0.875 | — | — | 0.915 | — |
| estimated % | 89 | 9 | 2 | 85 | 10 | 5 | 93 | 7 |

Application Example

Properties of the Material for a Specific Use as a Particulate Filter

In order to study the characteristics of parts formed from the material obtained according to the invention, especially for an application as particulate filters, samples were prepared from the fused grains conforming to the invention and prepared according to Example 1 and from a mixture of raw materials (new Example 6).

In Example 6, the reactants used were commercial powders of the single oxides of aluminum, silicon, magnesium and titanium.

All the initial powders (fused grains and raw materials) have a median diameter of less than 100 μm. Within the meaning of the present description, the median diameter denotes the diameter of the particles below which 50% by volume of the population is located.

As described previously in the description, a porous ceramic material is obtained in the following manner: the powders (fused grains for Example 1 and single oxides for Example 6) are mixed with 5%, relative to the total weight of the mixture of powders, with an organic binder of methyl cellulose type and 8% of a pore-forming agent. Water is added while mixing until a homogeneous paste is obtained, the plasticity of which enables the extrusion of a sample in the shape of a bar having the size of 6 mm×8 mm×60 mm, which is then sintered at 1450° C. for 4 hours.

In order to estimate the value of the material used in a "particulate filter" application, the following parameters were measured for these samples: the thermal expansion coefficient, the modulus of rupture and also the porosity characteristics. Conventionally, these characteristics are measured by the well-known techniques of high-pressure mercury porosimetry, using a Micromeritics 9500 porosimeter.

The sintering shrinkage expresses the dimensional change of the sample after sintering at 1450° C. More specifically, according to the invention the expression "sintering shrinkage" is understood to mean the average reduction along each of the two dimensions of the cross section of the material, that remains at low temperature, that is to say at a temperature below 400° C. and especially at ambient temperature. In Table 3, the value reported for the shrinkage corresponds to the average shrinkage for the two dimensions, expressed as a percentage of the initial dimension of the bar before sintering, for each of said dimensions. This characteristic is extremely important for estimating the feasibility of the process for manufacturing the porous structure. This is because a high sintering shrinkage means that the honeycomb made up of the material presents major difficulties for industrialization, especially for obtaining, with acceptable reproducibility, structures whose dimensional characteristics can be guaranteed with sufficient precision to enable the use thereof, without difficulties, in an automotive exhaust line.

The modulus of rupture (MOR) is determined at ambient temperature by 3-point bending on porous bars having a size of 6 mm×8 mm×60 mm obtained previously. The results are presented in Table 3.

TABLE 3

| | Example | | |
|---|---|---|---|
| | 1 (inv.) | 6 (comp.) | 5 (inv.) |
| $Al_2O_3$ | 45.1 | 44.9 | 50.0 |
| $TiO_2$ | 44.5 | 44.7 | 40.3 |
| MgO | 3.56 | 3.55 | 2.67 |
| $SiO_2$ | 6.46 | 6.49 | 5.75 |
| CaO | 0.04 | 0.03 | 0.06 |
| $Na_2O$ | 0.12 | 0.15 | 0.21 |
| $K_2O$ | 0.13 | 0.08 | <0.01 |
| $Fe_2O_3$ | 0.09 | 0.05 | 0.44 |
| $ZrO_2$ | <0.1 | <0.1 | 0.57 |
| MOR | 7.1 | 7.3 | 6.9 |
| Porosity % | 38.2 | 30.3 | 42.5 |
| Median diameter of the pores (microns) | 13.8 | 8.6 | 11.5 |
| Sintering shrinkage in % | 14.6 | 14.8 | 10.2 |
| TEC ($10^{-6}$/° C.) | 0.50 | 0.79 | 0.36 |

The results given in Table 3 show that the grains of the invention make it possible to obtain materials and products whose overall characteristics are substantially better than those of products obtained conventionally by using the conventional raw materials of the $SiO_2$, MgO, $Al_2O_3$ etc. type as initial reactants.

In particular, in comparison with the data from Table 1, the significant improvement of the mechanical strength which results from the use of fused grains according to the invention as initial products during the synthesis of the monoliths can be seen: the MOR strength of the porous bars according to Example 1 is in fact comparable to those of Example 6, whilst the constituent material of the bars according to Example 1 has a porosity that is more than 25% higher and a pore diameter that is more than 60% larger than those of the conventional material according to Example 6.

The material obtained according to Example 5 has a mechanical strength MOR which is very slightly less than that obtained for Examples 1 and 6 but porosity, sintering shrinkage and thermal expansion coefficient characteristics and properties that are substantially improved.

In the preceding examples and description, the invention has especially been described in relation to the advantages that it provides with regard to a use in the field of particulate filters.

However, it is obvious that the invention also relates to the use of the grains of the invention in other applications, in particular all those where a good thermal stability and also a good TEC are necessary. Depending on the application, the size of the fused grains according to the invention could especially be adapted, in particular by choosing a suitable milling method.

The invention claimed is:

1. A fused grain comprising an oxide phase of pseudo-brookite type, titanium, aluminum and magnesium, said fused grain having the following chemical composition, in weight percentages on the basis of the oxides:
    less than 52% of $Al_2O_3$;
    more than 30% and less than 70% of $TiO_2$;
    more than 1% and less than 15% of MgO,
    said fused grain also corresponding to the following composition, in molar percentages and on the basis of the single oxides $Al_2O_3$, $TiO_2$, MgO:
    $180 \leq 3t+a \leq 220$,
    $a \leq 50$,
    $m=100-a-t$
    in which:
    a is the molar percentage of $Al_2O_3$;
    t is the molar percentage of $TiO_2$;
    m is the molar percentage of MgO.

2. The fused grain as claimed in claim 1, having the following chemical composition, in weight percentages, on the basis of the oxides:
    more than 15% and less than 52% of $Al_2O_3$;
    more than 35% and less than 70% of $TiO_2$;
    more than 1% and less than 10% of MgO.

3. The fused grain as claimed in claim 2, having the following chemical composition, in weight percentages, on the basis of the oxides:
    more than 39% and less than 52% of $Al_2O_3$;
    more than 39% and less than 55% of $TiO_2$;
    more than 1% and less than 5% of MgO.

4. The fused grain as claimed in claim 1, further comprising silicon in an amount between 0.01 and 20%, on an $SiO_2$ basis and relative to the weight percentage on the basis of the oxides.

5. The fused grain as claimed in claim 1, comprising a main oxide phase composed of the phase of pseudo-brookite type and at least one secondary phase, said secondary phase being a silicate phase and/or a phase consisting essentially of titanium oxide $TiO_2$.

6. The fused grain as claimed in claim 1, in which the oxide phase of the pseudo-brookite type is a solid solution substantially corresponding to the formulation $(Al_2TiO_5)_x(MgTi_2O_5)_{1-x}$, in which x is greater than 0.

7. A process for manufacturing a fused grain as claimed in claim 1, comprising:
    a) mixing raw materials to form the starting feedstock;
    b) fusing the starting feedstock to obtain a molten liquid;
    c) rapid cooling of said molten liquid so that the fused liquid is entirely solidified to produce a solid mass; and
    d) milling the solid mass to obtain a mixture of grains.

8. A ceramic product comprising the fused grain as claimed in claim 1.

9. A ceramic product comprising a ceramic material obtained by a process comprising firing the fused grain as claimed in claim 1, at a temperature between 1300° C. and 1800° C., wherein said ceramic material mainly comprises an oxide phase of pseudo-brookite type comprising titanium, aluminum and magnesium, in proportions such that the pseudo-brookite type phase corresponds substantially to the formulation $(Al_2TiO_5)_x(MgTi_2O_5)_{1-x}$, and said ceramic material has the following chemical composition, in weight percentages on the basis of the oxides:
    less than 55% of $Al_2O_3$;
    more than 30% and less than 70% of $TiO_2$;
    more than 1% and less than 15% of MgO.

10. The ceramic product as claimed in claim 9, in which the phase of pseudo-brookite type has the following chemical composition, in weight percentages, on the basis of the oxides:
    more than 39% and less than 54% of $Al_2O_3$;
    more than 45% and less than 55% of $TiO_2$;
    more than 1% and less than 5% of MgO.

11. The ceramic product as claimed in claim 9, comprising a main phase comprising the phase of pseudo-brookite type and at least one secondary phase, said secondary phase being a silicate phase and/or a phase consisting essentially of titanium oxide $TiO_2$.

12. The ceramic product as claimed in claim 11, in which the secondary phase comprises a silicate phase, in proportions which may range from 0 to 40% of the total weight of the material.

13. The ceramic product as claimed in claim 9, having a honeycomb type structure, wherein the ceramic material forming said structure has a porosity of greater than 10% and a pore size centered between 5 and 60 microns.

14. The ceramic product as claimed in claim 13, in which said ceramic material has a value x of between 0.7 and 1 exclusive.

* * * * *